US007630891B2

(12) United States Patent
Oh et al.

(10) Patent No.: US 7,630,891 B2
(45) Date of Patent: Dec. 8, 2009

(54) VOICE REGION DETECTION APPARATUS AND METHOD WITH COLOR NOISE REMOVAL USING RUN STATISTICS

(75) Inventors: Kwang-cheol Oh, Kyungki-do (KR); Yong-beom Lee, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 838 days.

(21) Appl. No.: 10/721,271

(22) Filed: Nov. 26, 2003

(65) Prior Publication Data

US 2004/0172244 A1 Sep. 2, 2004

(30) Foreign Application Priority Data

Nov. 30, 2002 (KR) ..................... 10-2002-0075650

(51) Int. Cl.
*G10L 19/00* (2006.01)
*G10L 21/02* (2006.01)
*G10L 15/00* (2006.01)
*G10L 17/00* (2006.01)

(52) U.S. Cl. ....................... 704/233; 704/219; 704/226; 704/228; 704/231; 704/246; 704/200; 704/248; 704/249

(58) Field of Classification Search ................. 704/219, 704/233, 228, 226, 246, 231
See application file for complete search history.

(56) References Cited

U.S. PATENT DOCUMENTS 5,152,007 A * 9/1992 Uribe ......................... 455/116
5,572,623 A * 11/1996 Pastor ........................ 704/233
5,649,055 A * 7/1997 Gupta et al. ................ 704/233

(Continued)

FOREIGN PATENT DOCUMENTS

DE 10026872 A2 10/2001

(Continued)

OTHER PUBLICATIONS

Wee-Soon Ching; Peng-Seng Toh. "Enhancement of speech signal corrupted by high acoustic noise." TENCON '93. Proceedings. Computer, Communication, Control and Power Engineering.1993 IEEE Region 10 Conference on, vol., Iss.0, Oct. 19-21, 1993, pp. 1114-1117 vol. 2.*

(Continued)

*Primary Examiner*—David R Hudspeth
*Assistant Examiner*—Paras Shah
(74) *Attorney, Agent, or Firm*—Staas & Halsey LLP

(57) ABSTRACT

The present invention relates to a voice region detection apparatus and method capable of accurately detecting a voice region even in a voice signal with color noise. The voice region detection method comprises the steps of, if a voice signal is input, dividing the input voice signal into frames; performing whitening of surrounding noise by combining white noise with the frames; extracting random parameters indicating randomness of frames from the frames subjected to the whitening; classifying the frames into voice frames and noise frames based on the extracted random parameters; and detecting a voice region by calculating start and end positions of a voice based on the voice and noise frames. According to the present invention, the voice region can be accurately detected even in a voice signal with a large amount of color noise mixed therewith.

21 Claims, 9 Drawing Sheets

U.S. PATENT DOCUMENTS

| | | | | |
|---|---|---|---|---|
| 5,657,422 | A * | 8/1997 | Janiszewski et al. | 704/229 |
| 5,768,474 | A * | 6/1998 | Neti | 704/233 |
| 5,828,997 | A * | 10/1998 | Durlach et al. | 704/233 |
| 5,867,574 | A * | 2/1999 | Eryilmaz | 379/388.04 |
| 5,937,375 | A * | 8/1999 | Nakamura | 704/215 |
| 6,182,035 | B1 * | 1/2001 | Mekuria | 704/236 |
| 6,202,046 | B1 * | 3/2001 | Oshikiri et al. | 704/233 |
| 6,321,197 | B1 * | 11/2001 | Kushner et al. | 704/270 |
| 6,349,278 | B1 | 2/2002 | Krasny et al. | |
| 6,629,070 | B1 * | 9/2003 | Nagasaki | 704/233 |
| 6,741,873 | B1 * | 5/2004 | Doran et al. | 455/569.1 |
| 6,910,011 | B1 * | 6/2005 | Zakarauskas | 704/233 |
| 7,039,181 | B2 * | 5/2006 | Marchok et al. | 379/406.03 |
| 7,065,485 | B1 * | 6/2006 | Chong-White et al. | 704/208 |
| 7,130,801 | B2 | 10/2006 | Kitahara et al. | |
| 7,277,847 | B2 * | 10/2007 | Berger | 704/211 |
| 2003/0078770 | A1 * | 4/2003 | Fischer et al. | 704/214 |
| 2003/0105626 | A1 | 6/2003 | Fischer et al. | |
| 2003/0216909 | A1 * | 11/2003 | Davis et al. | 704/210 |

FOREIGN PATENT DOCUMENTS

| | | |
|---|---|---|
| KR | 20020030693 | 4/2002 |

OTHER PUBLICATIONS

Rezayee, A.; Gazor, S. "An adaptive KLT approach for speech enhancement." Speech and Audio Processing, IEEE Transactions on, vol. 9, Iss.2, Feb. 2001, pp. 87-95.*

Doh-Suk Kim; Soo-Young Lee; Kil, R.M., "Auditory processing of speech signals for robust speech recognition in real-world noisy environments," Speech and Audio Processing, IEEE Transactions on , vol. 7, No. 1, pp. 55-69, Jan 1999.*

European Search Report dated Feb. 25, 2004 in corresponding Application No. EP 03 25 7432.

* cited by examiner

VOICE REGION DETECTION APPARATUS AND METHOD WITH COLOR NOISE REMOVAL USING RUN STATISTICS

BACKGROUND OF THE INVENTION

This application claims the priority of Korean Patent Application No. 10-2002-0075650 filed on Nov. 30, 2002, in the Korean Intellectual Property Office, the disclosure of which is incorporated herein in its entirety by reference.

1. Field of Invention

The present invention relates to a voice region detection apparatus and method for detecting a voice region in an input voice signal, and more particularly, to a voice region detection apparatus and method capable of accurately detecting a voice region even in a voice signal with color noise.

2. Description of the Related Art

Voice region detection is used to detect only a pure voice region except a silent or noise region in an external input voice signal. A typical voice region detection method is a method of detecting a voice region by using energy of a voice signal and a zero crossing rate.

However, the aforementioned voice region detection method has a problem in that it is very difficult to distinguish voice and noise regions from each other since a voice signal with low energy such as in a voiceless sound region becomes buried in the surrounding noise in a case where the energy of the surrounding noise is large.

Further, in the above voice region detection method, the input level of a voice signal varies if a voice is input near a microphone or a volume level of the microphone is arbitrarily adjusted. To accurately detect a voice region under these circumstances, a threshold should be manually set on a case by case basis according to an input apparatus and usage environment. Thus, there is another problem in that it is very cumbersome to manually set a proper threshold.

To solve these problems in the voice region detection methods, Korean Patent Laying-Open No. 2002-0030693 entitled "Voice region determination method of a speech recognition system" discloses a method capable of detecting a voice region regardless of surrounding noise and an input apparatus by changing the threshold according to the input level of a voice upon detection of the voice region as shown in FIG. 1(*a*).

This voice region determination method can clearly distinguish voice and noise regions from each other in a case where surrounding noise is white noise as shown in FIG. 1(*b*). However, if the surrounding noise is color noise of which energy is high and whose shape varies with time as shown in FIG. 1(*c*), voice and noise regions may not be clearly distinguished from each other. Thus, there is a risk that the surrounding noise may be erroneously detected as a voice region.

Furthermore, since the voice region determination method requires repeated calculation and comparison processes, the amount of calculation is accordingly increased so that the method cannot be used in real time. Moreover, since the shape of the spectrum of a fricative is similar to that of noise, a fricative region cannot be accurately detected. Thus, there is a disadvantage in that the voice region determination method is not appropriate when more accurate detection of a voice region is required, such as in the case of speech recognition.

SUMMARY OF THE INVENTION

The present invention is conceived to solve the aforementioned problems. An object of the present invention is to accurately detect a voice region even in a voice signal with a large amount of color noise mixed therewith.

Another object of the present invention is to accurately detect a voice region only with a small amount of calculation and to detect a fricative region that is relatively difficult to detect due to difficulty in distinguishing a voice signal in the fricative region from surrounding noise.

According to the present invention for achieving these objects, there is provided a voice region detection apparatus comprising a preprocessing unit for dividing an input voice signal into frames; a whitening unit for combining white noise with the frames input from the preprocessing unit; a random parameter extraction unit for extracting random parameters indicating the randomness of frames from the frames input from the whitening unit; a frame state determination unit for classifying the frames into voice frames and noise frames based on the random parameters extracted by the random parameter extraction unit; and a voice region detection unit for detecting a voice region by calculating start and end positions of a voice based on the voice and noise frames input from the frame state determination unit.

Preferably, the apparatus further comprises a color noise elimination unit for eliminating color noise from the voice region detected by the voice region detection unit.

BRIEF DESCRIPTION OF THE DRAWINGS

The above and other objects and features of the present invention will become apparent from the following description of preferred embodiments given in conjunction with the accompanying drawings, in which.

DESCRIPTION OF THE PREFERRED EMBODIMENTS

The configuration and operations of a voice region detection apparatus according to the present invention will be described in detail with reference to the accompanying drawings.

Figure 1:
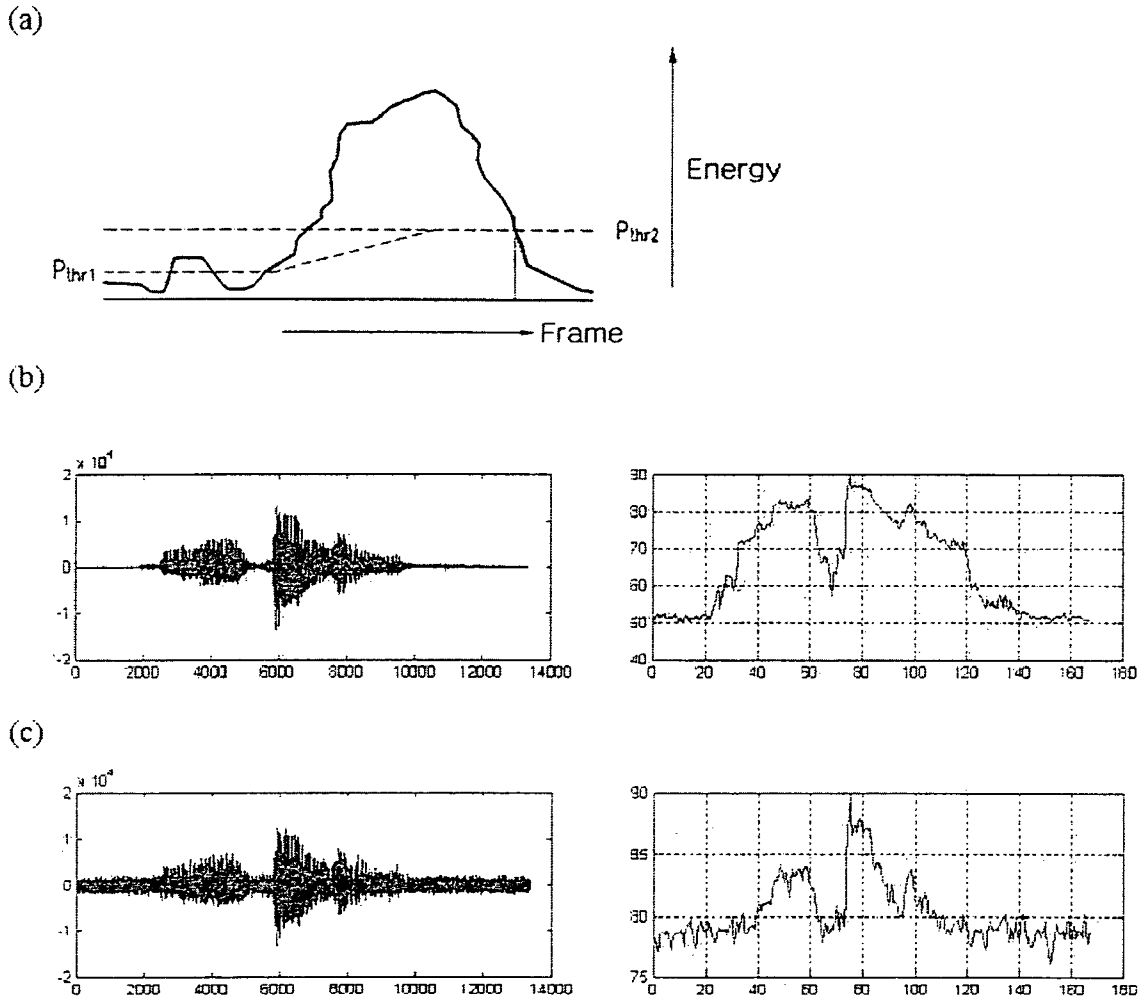
FIGS. 1(*a*) to (*c*) are views explaining operations of a conventional voice region detection apparatus.
Figure 2:
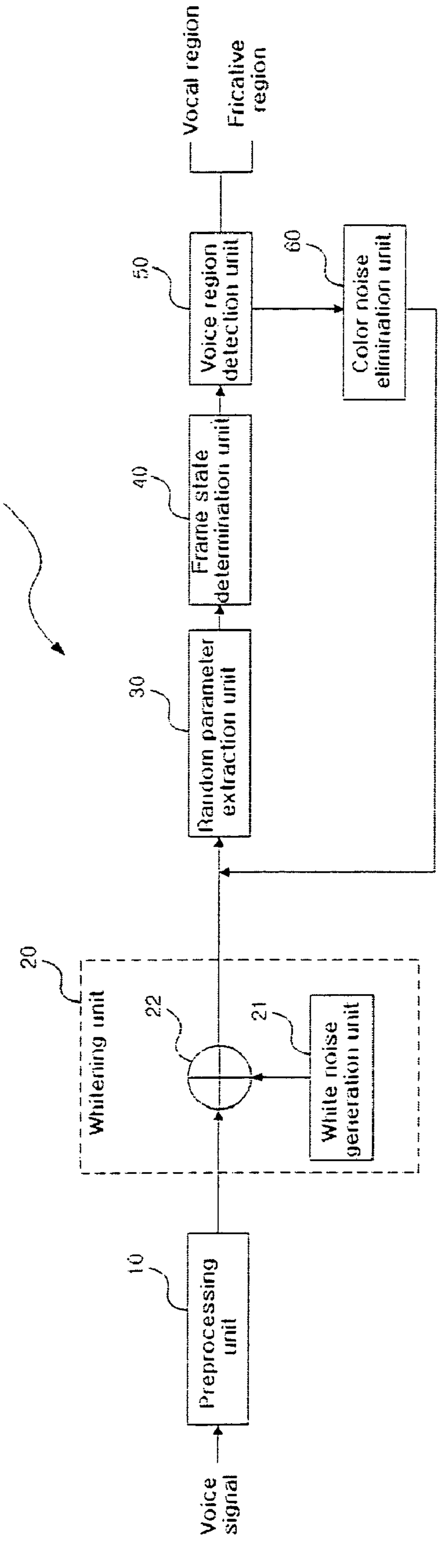
FIG. 2 is a schematic block diagram of a voice region detection apparatus according to the present invention.

FIG. 2 is a schematic block diagram of the voice region detection apparatus 100 according to the present invention. As shown in the figure, the voice region detection apparatus 100 comprises a preprocessing unit 10, a whitening unit 20, a random parameter extraction unit 30, a frame state determination unit 40, a voice region detection unit 50, and a color noise elimination unit 60.

The preprocessing unit 10 samples a voice signal according to a predetermined frequency from an input voice signal and then divides the sampled voice signal into frames that are basic units for processing a voice. In the present invention, respective frames are constructed on a 160 sample (20 ms) basis for a sampled voice signal with 8 kHz. The sampling rate and the number of samples per frame may be changed according to their intended application.

The voice signal divided into the frames is input into the whitening unit 20. The whitening unit 20 combines white noise with the input frames by means of a white noise generation unit 21 and a signal synthesizing unit 22 so as to perform whitening of surrounding noise and to increase the randomness of the surrounding noise in the frames.

The white noise generation unit 21 generates white noise for reinforcing the randomness of a non-voice region, i.e. surrounding noise. White noise is noise generated from a uniform or Gaussian distributed signal with a frequency spectrum of which the gradient is flat within a voice region such as the range from 300 Hz to 3500 Hz. Here, the amount of white noise generated by the white noise generation unit 21 can vary according to the amount and amplitude of the surrounding noise. In the present invention, initial frames of a voice signal are analyzed to set the amount of white noise and such a setting process can be performed upon initially driving the voice region detection apparatus 100.

The signal synthesizing unit 22 combines the white noise generated by the white noise generation unit 21 with the input frames of a voice signal. Since the configuration and operation of the signal synthesizing unit are the same as a signal synthesizing unit generally used in a voice processing field, a detailed description thereof will be omitted.

Figure 3:
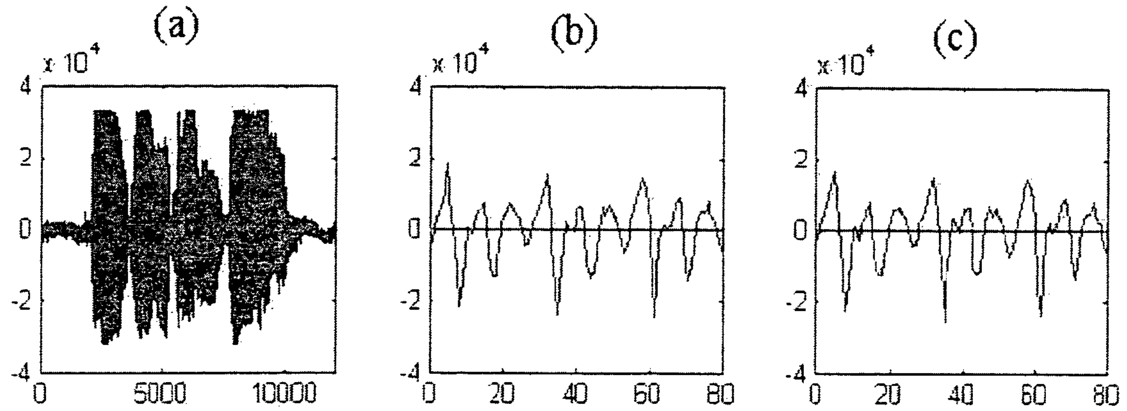
FIGS. 3(*a*) to (*c*) and FIGS. 4(*a*) to (*c*) are views explaining whitening of surrounding noise in frames.
Figure 4:
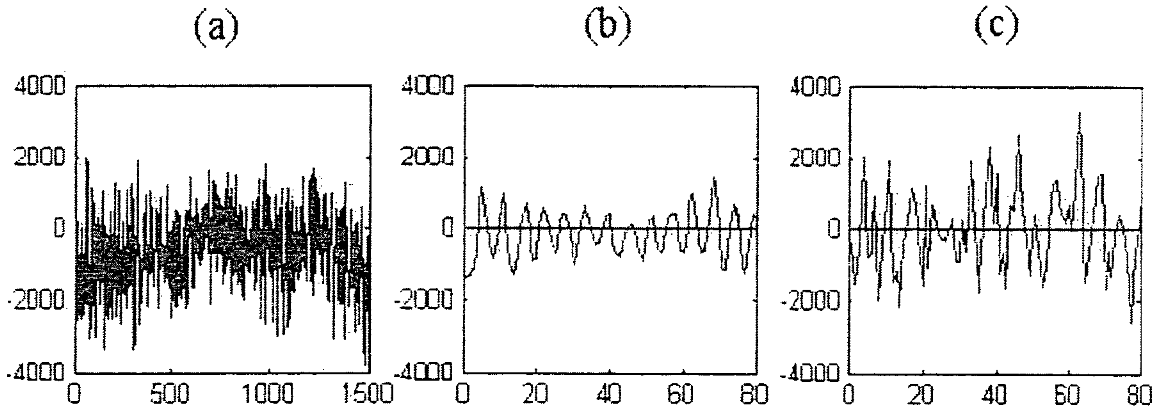

Examples of frame signals that have passed through the whitening unit 20 are shown in FIGS. 3(*a*) to (*c*) and FIGS. 4(*a*) to (*c*). FIG. 3(*a*) shows an input voice signal, FIG. 3(*b*) shows a frame corresponding to a vocal region in the voice signal of FIG. 3(*a*), and FIG. 3(*c*) shows results of combination of the frame of FIG. 3(*b*) with white noise. FIG. 4(*a*) shows an input voice signal, FIG. 4(*b*) shows a frame corresponding to color noise in the voice signal of FIG. 4(*a*), and FIG. 4(*c*) shows results of combination of the frame of FIG. 4(*b*) with white noise.

As shown in FIGS. 3(*a*) to (*c*), the combination of the frame corresponding to the vocal region with the white noise has little influence on the vocal signal because the vocal signal has a large amplitude. On the contrary, as shown in FIGS. 4(*a*) to (*c*), the combination of the frame corresponding to the color noise with the white noise causes whitening of the color noise, increasing the randomness of the color noise.

Meanwhile, it is possible to obtain satisfactory results of voice region detection by using a conventional voice region detection method in a voice signal that has relatively less color noise. However, it is difficult to accurately distinguish a noise region and a voice region by means of parameters such as energy or zero crossing rate in a voice signal that includes color noise of which frequency spectrum distribution is not uniform.

Therefore, the present invention employs a random parameter, which indicates how random a voice signal is, as a parameter for use in determining a voice region so as to accurately detect the voice region even in a voice signal with color noise mixed therewith. Hereinafter, the random parameter will be described in detail.

In the present invention, the random parameter is a parameter constructed from a result value obtained by statistically testing the randomness of a frame. More specifically, the random parameter is to represent the randomness of a frame as a numerical value based on a run test used in probability and statistics, by using the fact that a voice signal is random in a non-voice region but is not random in a voice region.

The term "run" means a sub-sequence consisting of consecutive identical elements in a sequence, i.e. the length of a signal with the same characteristics. For example, a sequence of ⌈T H H H T H H T T T⌋ has 5 runs, a sequence ⌈S S S S S S S S S S R R R R R R R R R R⌋ has 2 runs, and a sequence of ⌈S R S R S R S R S R S R S R S R S R S R⌋ has 20 runs. Determining the randomness of a sequence by using the number of runs as a test statistic is called "run test."

In the meantime, when the number of runs in a sequence is too large or small, the sequence is determined as being not random. The reason is that if the number of runs in a sequence is too small such as in the sequence of ⌈S S S S S S S S S S R R R R R R R R R R⌋, a possibility that "S" or "R" may be consecutively positioned becomes high. Thus, such a sequence is determined as a non-random sequence. Further, even when the number of runs, which is a sequence, is too large such as in the sequence of ⌈S R S R S R S R S R S R S R S R S R S R⌋, the possibility that "S" or "R" may be repeatedly changed at predetermined intervals becomes high. Thus, such a sequence is also determined as a non-random sequence.

Therefore, if a parameter is constructed by applying such a run test concept to a frame, detecting the number of runs in the frame and using the detected number of runs as a test statistic, it is possible to distinguish a voice region with a periodic characteristic from a noise region with a random characteristic based on a value of the parameter. The random parameter for indicating the randomness of a frame in the present invention is defined by the following equation:

$$NR = \frac{R}{n},$$

where NR is the random parameter, n is a half of the length of a frame, and R is the number of runs in the frame.

Now, whether the random parameter is a parameter for indicating the randomness of the frame will be tested by using statistical hypothesis testing.

The statistical hypothesis testing refers to hypothesis testing by which the value of a test statistic is obtained on the assumption that null hypothesis/alternative hypothesis are correct, and whether null hypothesis/alternative hypothesis are reasonable is then determined by means of a possibility of occurrence of the value. A hypothesis "the random parameter is a parameter for indicating the randomness of a frame" will be tested according to the statistical hypothesis testing, as follows.

First, assume that a frame comprises a bit stream constructed only of "0" and "1" through quantizing and coding, the numbers of "0" and "1" in the frame are n1 and n2, respectively, and the numbers of runs for "0" and "1" are y1 and y2, respectively. Then, the number of branches for arranging the y1 "0" runs and the y2 "1" runs becomes:

$$\binom{n1+n2}{n1},$$

and the number of branches for producing the y1 runs among the n1 "0" becomes:

$$\binom{n1-1}{y1-1}.$$

Likewise, the number of branches for producing the y2 runs among the n2 "1" becomes:

$$\binom{n2-1}{y2-1}.$$

Therefore, a probability that the y1 runs for "0" and the y2 runs for "1" occur is expressed as the following equation 1:

$$P(y1, y2) = \frac{P(y1y2)}{P(y1)} = \frac{\binom{n1-1}{y1-1}\binom{n2-1}{y2-1}}{\binom{n1+n2}{n1}} \tag{1}$$

In the meantime, if it is assumed that the frame is random, the numbers "0" and "1" can be considered as being nearly identical to each other and the numbers of runs for "0" and "1" can also be considered as being nearly identical to each other.

That is, if is assumed that n1≈n2≈n and y1≈y2≈y for the sake of convenience of calculation, Equation 1 can be expressed as the following equation 2:

$$P(y, y) = \frac{\binom{n-1}{y-1}\binom{n-1}{y-1}}{\binom{2n}{n}} \tag{2}$$

Meanwhile, when Equation 2 is rearranged according to a combination equation of $$nCr = \left[\begin{matrix} n \\ r \end{matrix}\right] = \frac{n!}{(n-r)!r!}$$

indicating a probability of randomly selecting r among n, Equation 2 can be expressed as the following equation 3 through the following process:

$$\begin{aligned} P(y, y) &= \frac{\frac{(n-1)!}{(n-y)!(y-1)!} \times \frac{(n-1)!}{(n-y)!(y-1)!}}{\frac{(2n)!}{n!n!}} \\ &= \left(\frac{(n-1)!}{(n-y)!(y-1)!}\right)^2 \frac{n!n!}{(2n)!} \\ &= \left(\frac{1}{(n-y)!(y-1)!}\right)^2 \frac{((n-1)!n!)^2}{(2n)!} \end{aligned} \tag{3}$$

Therefore, a probability P(R) that there are a total of R (R=y1+y2) runs by summing up the number of runs for "0" y1 and the number of runs for "1" y2 in the frame can be expressed as the following equation 4:

$$P(R) \approx 2\left(\frac{1}{(n-y)!(y-1)!}\right)^2 \frac{((n-1)!n!)^2}{(2n)!} \tag{4}$$

As can be seen from Equation 4, since the probability P(R) that there are a total of R runs within the frame is a function with the number of runs for "0" and "1" y as variables, the number of runs y can be accordingly set as a test statistic.

Figure 5:
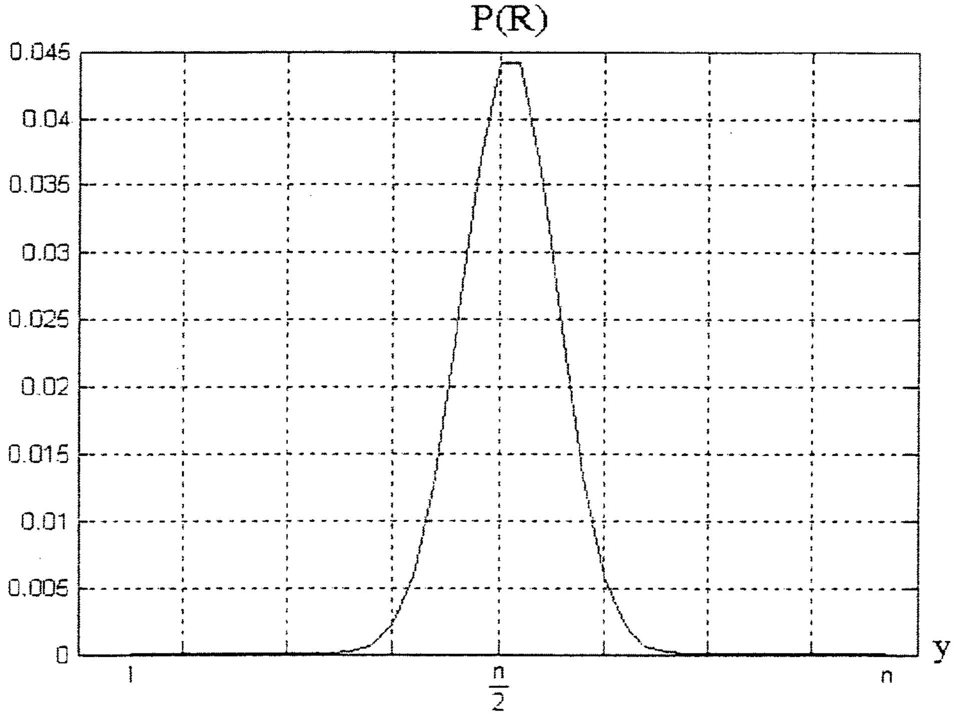
FIG. 5 is a graph of a probability P(R) that the number of runs is R in a frame.

As shown in FIG. 5, it can be seen that when the probability P(R) that the number of runs in the frame is R is plotted as a graph, the probability P(R) has a minimum value upon y=1 or y=n and a maximum value upon y=n/2, and follows a normal distribution of which the mean E(R) and the dispersion V(R) are E(R)=n+1 and V(R)=n(n−1)/(2n−1), respectively.

In the meantime, an error rate can be calculated from the probability P(R) that follows a normal distribution, and the probability in the normal distribution such as shown in FIG. 5 is the same as the area below the curve of the graph. That is, the following equation 5 can be induced from the mean E(R) and variance V(R) of R.

$$P(E(R)-\beta\sqrt{V(R)}<R<E(R)+\beta\sqrt{V(R)})=\alpha \tag{5}$$

That is, the error rate is expressed as 1−α and can be adjusted β as shown in Equation 5. That is, when n is 40, α becomes 0.6826 upon β=1, α becomes 0.9544 upon β=2, and α becomes 0.9973 upon β=3. Namely, if it is determined that a portion which is two or more times as large as the standard deviation is not random, an error of 4.56% is included.

Therefore, since the null hypothesis "the random parameter is a parameter for indicating the randomness of a frame" cannot be rejected, it has been proven that the random parameter is the parameter for indicating the randomness of the frame.

Referring again to FIG. 2, the random parameter extraction unit 30 calculates the numbers of runs in the input frames and extracts random parameters based on the calculated numbers of runs. Hereinafter, a method of extracting the random parameters in the frames will be described with reference to FIG. 6.

Figure 6:
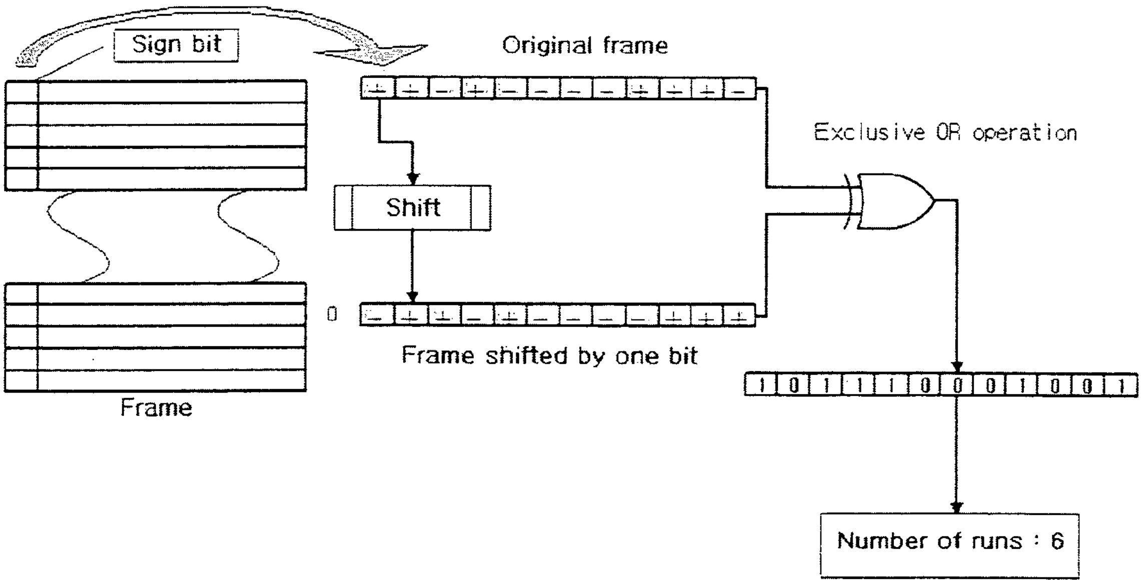
FIG. 6 is a view explaining extraction of a random parameter from a frame.

FIG. 6 is a view explaining the method of extracting the random parameters in the frames. As shown in the figure, sample data of each of the input frames are first shifted by one bit toward the most significant bit, and "0" is inserted into the least significant bit. Then, an exclusive OR operation is performed for sample data of a frame obtained by shifting the original frame by one bit and the sample data of the original frame. Thereafter, the number of "1s" in a result value obtained according to the exclusive OR operation, i.e. the number of runs in the frame, is calculated and the calculated number is divided by half of the length of the frame and is then extracted as the random parameter.

When the random parameters are extracted by the random parameter extraction unit 30 through such a process, the frame state determination unit 40 determines the states of the frames based on the extracted random parameters and classifies the frames into voice frames with voice components and noise frames with noise components. A method of determining the states of the frames based on the extracted random parameters will be specifically described later with reference to FIG. 8.

The voice region detection unit 50 detects a voice region by calculating start and end positions of a voice based on the input voice and noise frames.

In the meantime, in a case where the input voice signal includes a large amount of color noise, the voice region detected by the voice region detection unit 50 may contain color noise to a certain extent. To prevent this, the present invention finds out characteristics of the color noise through a color noise elimination unit 60 and eliminates the color noise. Then, the voice region from which the color noise has been eliminated is again output to the random parameter extraction unit 30.

Here, as for a noise elimination method, it is possible to use a method of simply obtaining an LPC coefficient in a region considered as surrounding noise and performing LPC reverse filtering for the voice region as a whole.

When frames of the voice region from which the color noise has been eliminated are input into the random parameter extraction unit 30, the frames are again subjected to the processes of the random parameter extraction, frame state determination and voice region detection. Accordingly, the possibility that color noise may be included in the voice region can be minimized.

Therefore, since the color noise included in the voice region is eliminated by the color noise elimination unit 60, only the voice region can be accurately detected even though a voice signal including a large amount of color noise is input.

Meanwhile, a voice region detection method of the present invention comprises the steps of if a voice signal is input, dividing the input voice signal into frames; performing whitening of surrounding noise by combining white noise with the frames; extracting random parameters indicating randomness of frames from the frames subjected to the whitening; classifying the frames into voice frames and noise frames based on the extracted random parameters; and detecting a voice region by calculating start and end positions of a voice based on the plurality of voice and noise frames.

Hereinafter, the voice region detection method of the present invention will be described in detail with reference to the accompanying drawings.

Figure 7:
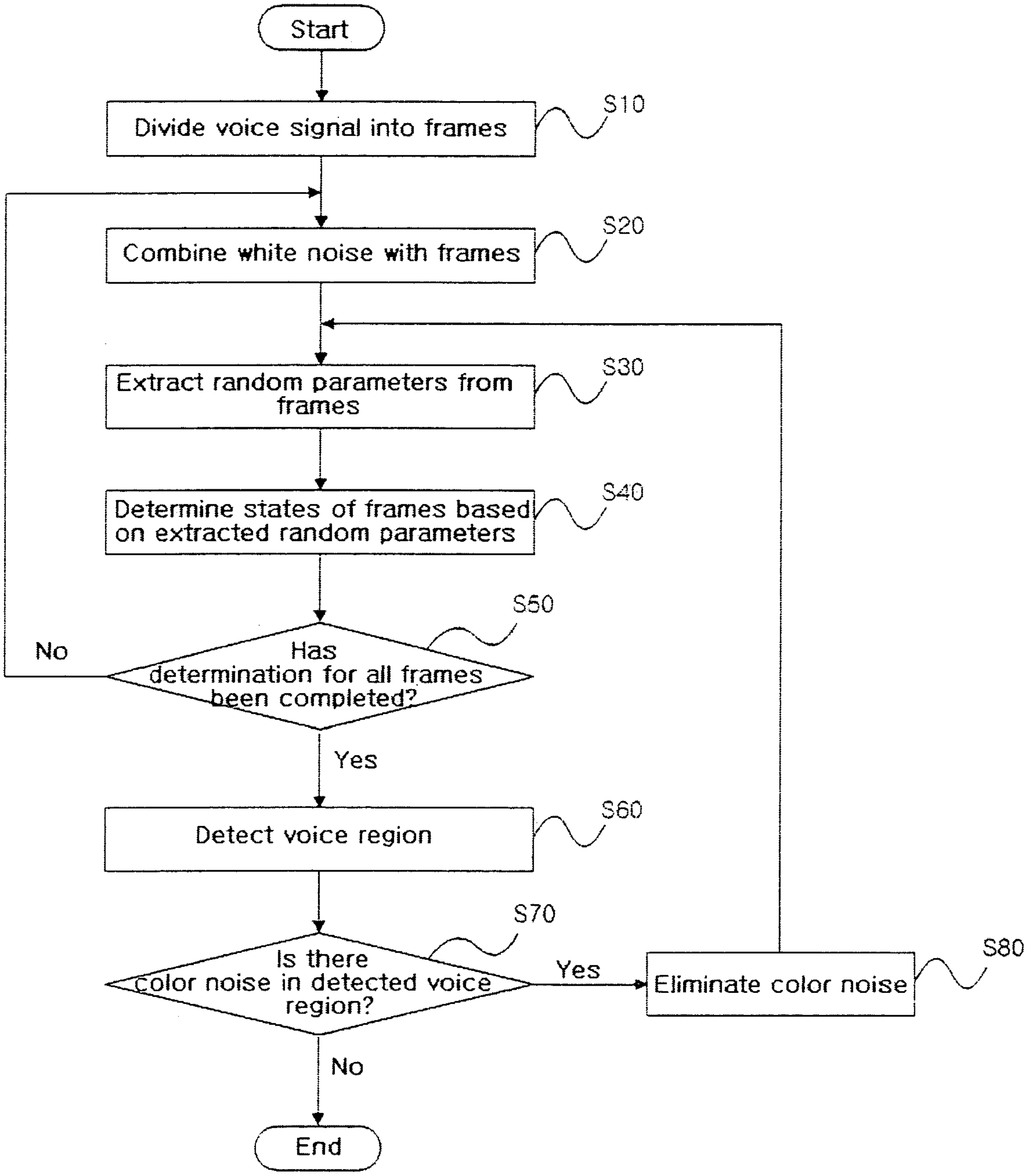
FIG. 7 is a flowchart generally illustrating a voice region detection method according to the present invention.

FIG. 7 is a flowchart illustrating the voice region detection method of the present invention.

First, when a voice signal is input, the input voice signal is sampled according to a predetermined frequency by the preprocessing unit 10 and the sampled voice signal is divided into frames that are basic units for processing a voice signal (S10).

Here, intervals between the frames are made as small as possible so that phonemic components can be accurately caught. It is preferred that the occurrence of data loss between the frames be prevented by partially overlapping the frames with one another.

Then, the whitening unit 20 combines white noise with the input frames so as to achieve whitening of the surrounding noise (S20). If the frames are combined with the white noise, randomness of the noise components included in the frames is increased and thus it is possible to clearly distinguish a voice region with a periodic characteristic from a noise region with a random characteristic upon detection of the voice region.

Then, the random parameter extraction unit 30 calculates the numbers of runs in the frames and extracts random parameters based on the numbers of runs obtained through the calculation (S30). Since the method of extracting the random parameters has been described in detail with reference to FIG. 6, a detailed description thereof will be omitted.

Thereafter, the frame state determination unit 40 determines the states of the frames based on the random parameters extracted by the random parameter extraction unit 30 and classifies the frames into voice frames and noise frames (S40). Hereinafter, the frame state determination step S40 will be described in more detail with reference to FIGS. 8 and 9.

Figure 8:
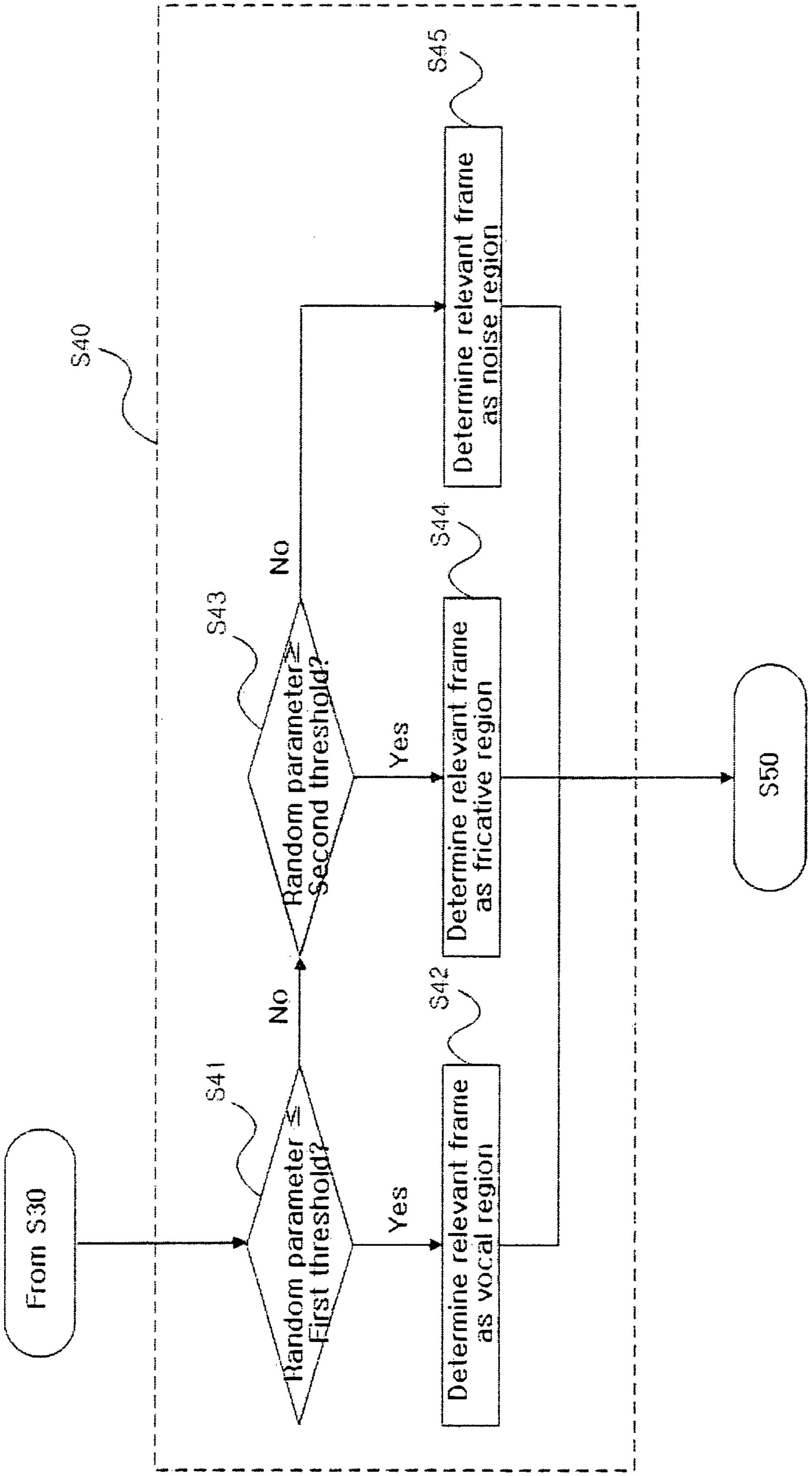
FIG. 8 is a flowchart specifically illustrating the frame state determination step in FIG. 7.
Figure 9:
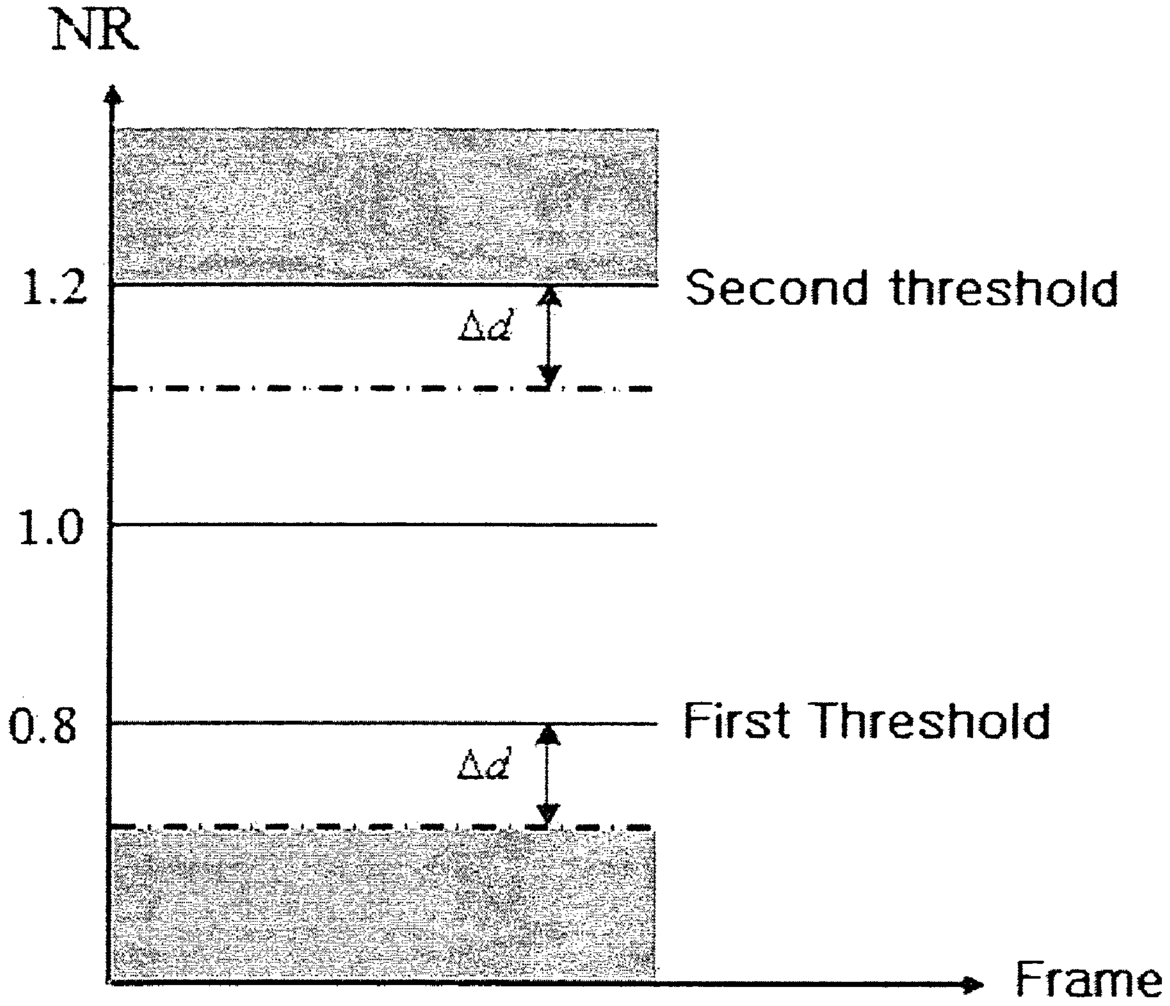
FIG. 9 is a view explaining a method of determining the states of frames.

FIG. 8 is a flowchart specifically illustrating the frame state determination step S40 in FIG. 7, and FIG. 9 is a view explaining the setting of threshold values for determining the states of the frames.

As a result of the extraction of the random parameters for the frames, the random parameters have values of between 0 and 2. Particularly, each of the random parameters has a characteristic that it has a value close to 1 in a noise region with a random characteristic, a value less than 0.8 in a general voice region including a vocal sound, and a value more than 1.2 in a fricative region.

Therefore, the present invention determines the states of the frames based on the extracted random parameters by using the characteristic of the random parameters as shown in FIG. 9, and classifies the frames into voice frames with voice components and noise frames with noise components. Particularly, reference values for determining whether a voice is a vocal sound or fricative are beforehand set as first and second thresholds, respectively, and the random parameters of the frames are compared with the first and second thresholds, so that the voice frames can also be classified into vocal frames and fricative frames. Here, it is preferred that the first and second thresholds be 0.8 and 1.2, respectively.

That is, if a random parameter of a frame is below the first threshold, the frame state determination unit 40 determines that the relevant frame is a vocal frame (S41 and S42). If the random parameter of the frame is above the second threshold, the frame state determination unit 40 determines that the relevant frame is a fricative frame (S43 and S44). If the random parameter of the frame is between the first and second threshold, the frame state determination unit 40 determines that the relevant frame is a noise frame (S45).

Then, it is checked whether frame state determination for all the frames of the input voice signal has been completed (S50). If the frame state determination for all the frames has been completed, a voice region is detected by calculating start and end positions of a voice based on a plurality of vocal, fricative and noise frames detected through the frame state determination (S60). If not so, the whitening, random parameter extraction and frame state determination are performed on the next frame.

In the meantime, if a large amount of color noise is included in the input voice signal, there is a possibility that color noise may be included in the voice region detected through voice region detection step S60.

Therefore, according to the present invention, if it is determined that color noise is included in the detected voice region, a characteristic of the color noise included in the voice region is found out and eliminated in order to improve the reliability of voice region detection (S70 and S80). Hereinafter, the color noise elimination steps S70 and S80 will be described in more detail with reference to FIGS. 10(*a*) to (*c*).

Figure 10:
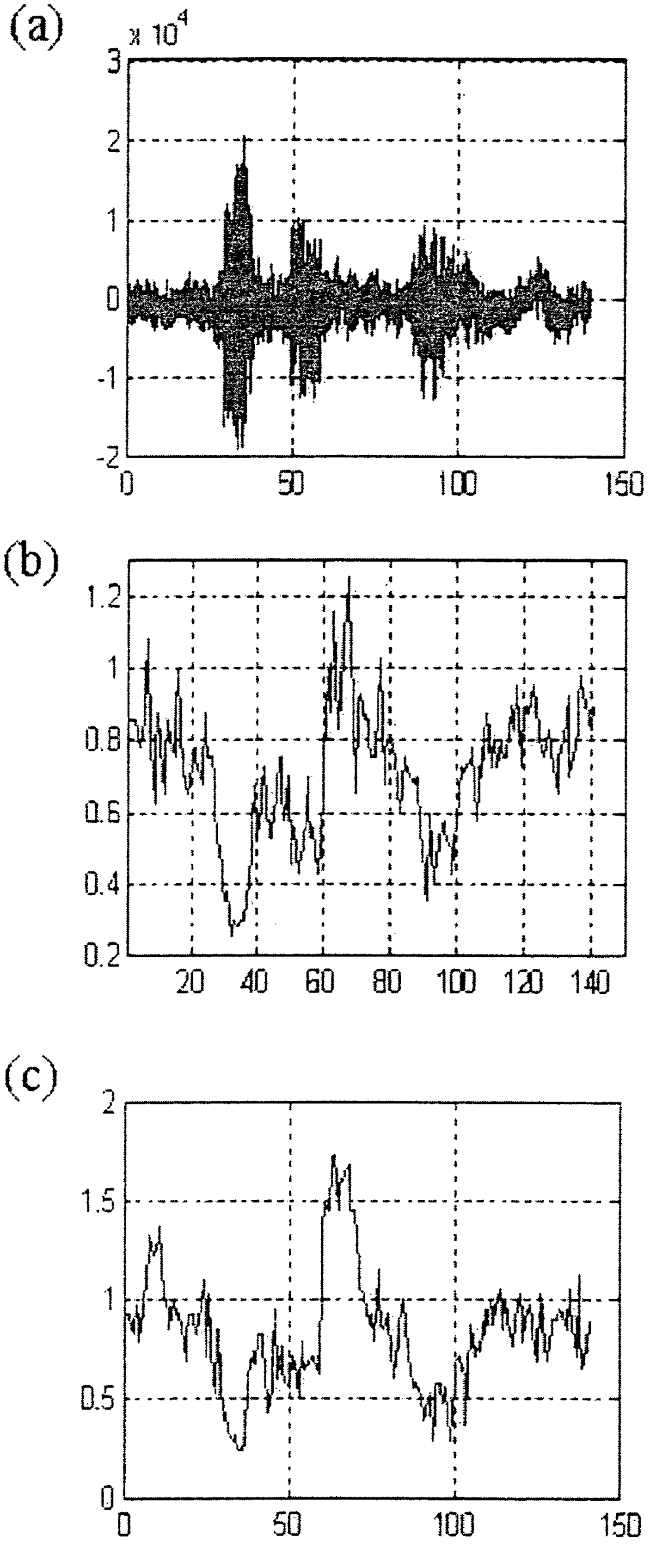
FIGS. 10(*a*) to (*c*) are views explaining a method of eliminating color noise from a detected voice region.

FIGS. 10(*a*) to (*c*) are views explaining the method of eliminating the color noise from the detected voice region. FIG. 10(*a*) shows a voice signal with color noise mixed therewith, FIG. 10(*b*) shows random parameters for the voice signal of FIG. 10(*a*), and FIG. 10(*c*) shows the result of extraction of random parameters after eliminating the color noise from the voice signal.

When the random parameters are extracted from the voice signal with the color noise mixed therewith as shown in FIG. 10(*b*), it can be seen that the random parameters are generally lower by about 0.1 to 0.2 due to the color noise as compared with those of FIG. 10(*c*). Therefore, when such a characteristic of the random parameters is used, it is possible to determine whether color noise is included in the voice region detected by the voice region detection unit 50.

As shown in FIG. 9, assuming that the amount of reduction in the random parameters due to the color noise is Δd, it is possible to determine that color noise is included in the voice region, if a mean value of the random parameters for the detected voice region is lower by Δd or more than the first or second threshold.

That is, the color noise elimination unit 60 calculates the mean value of the random parameters in the voice region detected by the voice region detection unit 50 and determines that color noise is included in the detected voice region, if the calculated mean value of the random parameters is below first threshold—Δd or second threshold—Δd.

At this time, it is preferred that the first and second thresholds be 0.8 and 1.2, respectively, and the amount of reduction in random parameter due to the color noise Δd be 0.1 to 0.2.

Then, if it is determined through the aforementioned process that color noise is included in the voice region, the color noise elimination unit 60 finds out and eliminates the characteristics of color noise included in the voice region (S80). As for the method of eliminating the noise, it is possible to use the method of simply obtaining the LPC coefficient in a region considered as surrounding noise and performing the LPC reverse filtering for the voice region as a whole. Alternatively, other methods of eliminating noise may be used.

Then, frames of the voice region from which the color noise has been eliminated are again input into the random parameter extraction unit 30 and subjected to the aforementioned random parameter extraction, frame state determination and voice region detection. Accordingly, since it is possible to minimize the possibility that color noise may be included in the voice region, only the voice region can be accurately detected from the voice signal with color noise mixed therewith.

Figure 11:
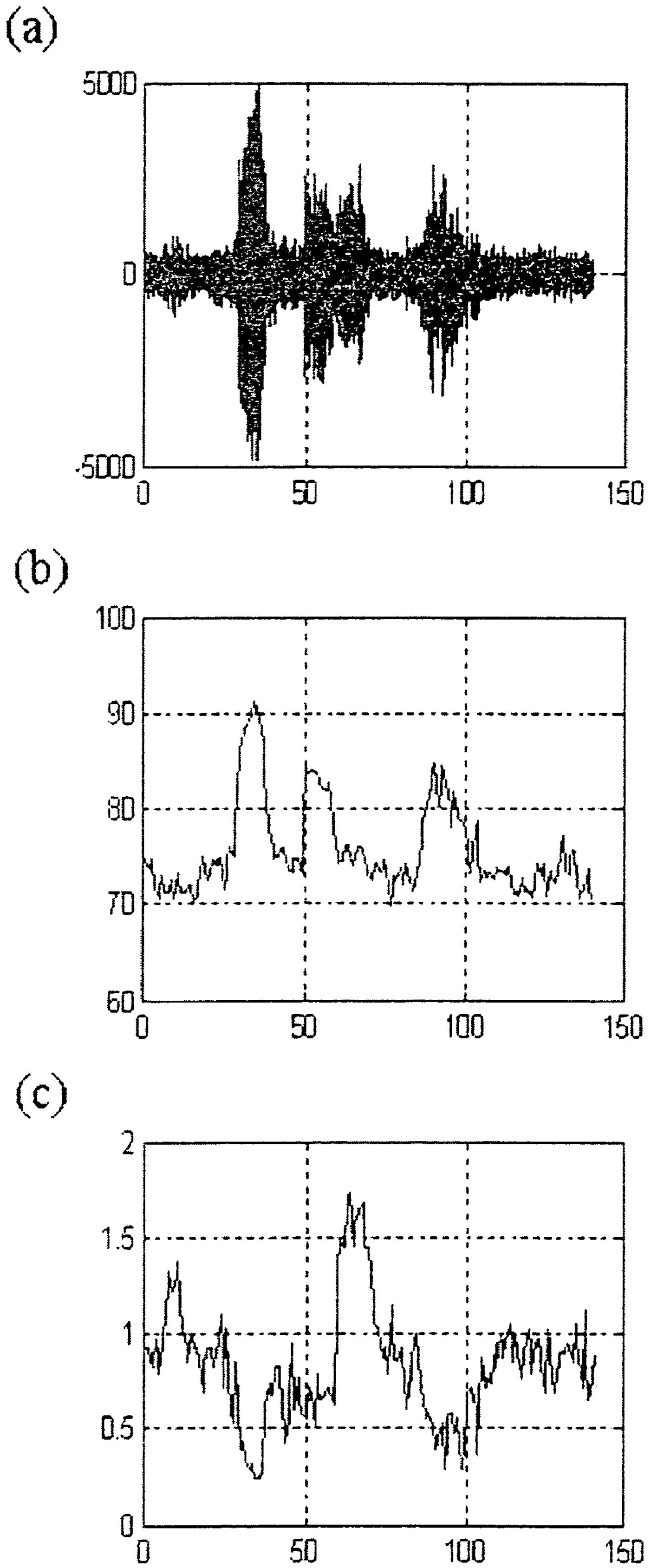
FIGS. 11(*a*) to (*c*) are views showing an example in which voice region detection performance is improved according to random parameters of the present invention.

FIGS. 11(*a*) to (*c*) are views showing an example in which voice region detection performance is improved according to the random parameters of the present invention. FIG. 11(*a*) shows a "spreadsheet" of a voice signal recorded in a cellular phone terminal, FIG. 11(*b*) shows mean energy of the voice signal of FIG. 11(*a*), and FIG. 11(*c*) shows random parameters for the voice signal of FIG. 11(*a*).

If a conventional energy parameter is used, a region for "spurs" in the voice signal is masked with color noise and thus the voice region cannot be properly detected, as shown in FIG. 11(*b*). On the contrary, if the random parameter of the present invention is used, the voice region can be securely distinguished from the noise region even in a voice signal with color noise mixed therewith, as shown in FIG. 11(*c*).

As described above, according to the voice region detection apparatus and method of the present invention, since a voice region can be accurately detected even in a voice signal with a large amount of color noise mixed therewith and fricatives that are relatively difficult to detect due to difficulty in distinguishing them from noise can also be accurately detected, there is an advantages in that the performance of a speech recognition system and a speaker recognition system that require accurate detection of the voice region can be improved.

Further, according to the present invention, since the voice region can be accurately detected without changing thresholds for detecting the voice region in accordance with the environment, there is an advantage in that the amount of unnecessary calculation can be reduced.

Moreover, according to the present invention, it is possible to prevent increases in the capabilities of a memory device due to the processing of a voice signal through consideration of silent and noise regions as the voice signal, and it is also possible to shorten processing time by extracting and processing only a voice region.

Although the present invention has been described in connection with the preferred embodiments thereof shown in the accompanying drawings, they are mere examples of the present invention. It can also be understood by those skilled in the art that various changes and modifications thereof can be made thereto without departing from the scope and spirit of the present invention defined by the claims. Therefore, the true scope of the present invention should be defined by the technical spirit of the appended claims.

What is claimed is:

1. A voice region detection apparatus, comprising:

a preprocessing unit for dividing an input voice signal into input frames comprised of a sequence of elements having a number of runs;

a whitening unit for combining white noise with the frames input from the preprocessing unit;

a random parameter extraction unit for extracting random parameters indicating the randomness of frames from the frames input from the whitening unit;

a frame state determination unit for classifying the frames into voice frames and noise frames based on the random parameters extracted by the random parameter extraction unit;

a voice region detection unit for detecting a voice region by calculating start and end positions of a voice based on the voice and noise frames input from the frame state determination unit wherein the random parameter extraction unit extracts a random parameter for a frame input from the whitening unit based on a determination of the number of runs in said frame wherein the input frames include vocal frames and fricative frames, wherein the frame state determination unit determines that if the random parameter of a frame extracted by the random parameter extraction unit is below a first threshold, the relevant frame is one of the vocal frames, wherein the frame state determination unit determines that, if the random parameter of a frame extracted by the random parameter extraction unit is above a second threshold, the relevant frame is one of the fricative frames; and a color noise elimination unit for eliminating color noise from the voice region detected by the voice region detection unit, wherein the color noise elimination unit eliminates the color noise from the detected voice region if the random parameter of the voice region detected by the voice region detection unit is below a predetermined threshold, wherein the predetermined threshold is a value obtained by subtracting the amount of reduction in the random parameter due to the color noise from the first threshold, or wherein the predetermined threshold is a value obtained by subtracting the amount of reduction in the random parameter due to the color noise from the second threshold.

2. The apparatus as claimed in claim 1, wherein the preprocessing unit samples the input voice signal according to a predetermined frequency and divides the sampled voice signal into a plurality of frames.

3. The apparatus as claimed in claim 2, wherein the plurality of frames overlap with one another.

4. The apparatus as claimed in claim 1, wherein the whitening unit comprise a white noise generation unit for generating the white noise, and a signal synthesizing unit for combining the frames input from the preprocessing unit with the white noise generated by the white noise generation unit.

5. The apparatus as claimed in claim 1, wherein each of said runs consists of consecutive identical elements in the sequence of elements that comprise the frame subjected to the whitening by the whitening unit.

6. The apparatus as claimed in claim 1, wherein the random parameter is:

$$NR = \frac{R}{n}$$

wherein NR is a random parameter of a frame, n is a half of the length of the frame, and R is the number of runs in the frame.

7. The apparatus as claimed in claim 1, wherein the first threshold is 0.8.

8. The apparatus as claimed in claim 1, wherein the second threshold is 1.2.

9. The apparatus as claimed in claim 1, wherein the frame state determination unit determines that, if the random parameter of the frame extracted by the random parameter extraction unit is above the first threshold and below the second threshold, the relevant frame is a noise frame.

10. The apparatus as claimed in claim 9, wherein the first threshold is 0.8, and the second threshold is 1.2.

11. The apparatus as claimed in claim 1, further comprising a color noise elimination unit for eliminating color noise from the voice region detected by the voice region detection unit.

12. A voice region detection method, comprising:

if a voice signal is input, dividing the input voice signal into input frames comprised of a sequence of elements having a number of runs;

performing whitening of surrounding noise by combining white noise with the frames;

extracting random parameters indicating randomness of frames from the frames subjected to the whitening;

classifying the frames into voice frames and noise frames based on the extracted random parameters;

detecting a voice region by calculating start and end positions of a voice based on the voice and noise frames, wherein extracting a random parameter from a frame subjected to the whitening includes determining the number of runs in said frame, wherein the input frames include vocal frames and fricative frames;

determining that, if the extracted random parameter of the frame is below a first threshold, the relevant frame is one of the vocal frames;

determining that if the extracted random parameter of the frame is above a second threshold, the relevant frame is one of the fricative frames; and eliminating the color noise from the detected voice region if the random parameter of the voice region detected by the voice region detection unit is below a predetermined threshold, wherein the predetermined threshold is a value obtained by subtracting the amount of reduction in the random parameter due to the color noise from the first threshold, or wherein the predetermined threshold is a value obtained by subtracting the amount of reduction in the random parameter due to the color noise from the second threshold.

13. The method as claimed in claim 12, wherein the dividing comprises sampling the input voice signal according to a predetermined frequency and dividing the sampled voice signal into a plurality of frames.

14. The method as claimed in claim 13, wherein the plurality of frames overlap with one another.

15. The method as claimed in claim 12, wherein the performing whitening comprises:

generating the white noise, and combining the frames with the generated white noise.

16. The method as claimed in claim 12, wherein each of said runs consist of consecutive identical elements in the sequence of elements that comprise the frame subjected to the whitening.

17. The method as claimed in claim 12, wherein the random parameter is:

$$NR = \frac{R}{n}$$

wherein NR is a random parameter of a frame, n is a half of the length of the frame, and R is the number of runs in the frame.

18. The method as claimed in claim 12, wherein the first threshold is 0.8.

19. The method as claimed in claim 12, wherein the second threshold is 1.2.

20. The method as claimed in claim 12, further comprising determining that, if the extracted random parameter of the frame is above the first threshold and below the second threshold, the relevant frame is a noise frame.

21. The method as claimed in claim 20, wherein the first threshold is 0.8, and the second threshold is 1.2.

* * * * *

UNITED STATES PATENT AND TRADEMARK OFFICE

CERTIFICATE OF CORRECTION

PATENT NO. : 7,630,891 B2
APPLICATION NO. : 10/721271
DATED : December 8, 2009
INVENTOR(S) : Kwang-cheol Oh et al.

It is certified that error appears in the above-identified patent and that said Letters Patent is hereby corrected as shown below:

Column 10, Line 31, change “unit” to --unit;--.

Column 10, Line 35, change “frame” to --frame,--.

Signed and Sealed this

Ninth Day of March, 2010

David J. Kappos
*Director of the United States Patent and Trademark Office*